(12) United States Patent
Neumann et al.

(10) Patent No.: US 7,344,002 B2
(45) Date of Patent: Mar. 18, 2008

(54) METHOD AND APPARATUS FOR FILLING THE BEARING GAP OF A HYDRODYNAMIC BEARING WITH A LUBRICANT

(75) Inventors: Rudolf Neumann, Spaichingen (DE); Olaf Winterhalter, Epfendorf (DE); Carsten Etling, Spaichingen (DE); Guido Schmid, Triberg (DE); Holger Schoenfelder, Dauchingen (DE)

(73) Assignee: Minebea Co., Ltd., Kitasaku-gun, Nagano (JP)

( * ) Notice: Subject to any disclaimer, the term of this patent is extended or adjusted under 35 U.S.C. 154(b) by 716 days.

(21) Appl. No.: 10/814,961

(22) Filed: Mar. 31, 2004

(65) Prior Publication Data

US 2004/0256178 A1 Dec. 23, 2004

(30) Foreign Application Priority Data

Mar. 31, 2003 (DE) ............................. 103 15 222
Mar. 31, 2003 (DE) ............................. 103 15 223

(51) Int. Cl.
*F16C 1/24* (2006.01)

(52) U.S. Cl. .................... 184/5.1; 384/100; 384/107

(58) Field of Classification Search ................ 184/5.1; 384/100, 107

See application file for complete search history.

(56) References Cited

U.S. PATENT DOCUMENTS

| 5,601,125 | A | 2/1997 | Parsoneault et al. |
|---|---|---|---|
| 5,778,948 | A | 7/1998 | Gomyo et al. |
| 5,862,841 | A | 1/1999 | Wuester, Sr. |
| 5,894,868 | A | 4/1999 | Wuester, Sr. |
| 6,305,439 | B1 | 10/2001 | Pool et al. |
| 6,340,644 | B1 | 1/2002 | Becker et al. |
| 6,416,294 | B1 | 7/2002 | Zengerle et al. |
| 6,694,617 | B2* | 2/2004 | Gredinberg et al. ..... 29/898.02 |
| 2003/0003027 | A1 | 1/2003 | Albert et al. |
| 2006/0029313 | A1* | 2/2006 | Hamada et al. ............. 384/107 |
| 2006/0274448 | A1* | 12/2006 | Asada et al. ............. 360/99.08 |

FOREIGN PATENT DOCUMENTS

| DE | 36 32 .350 | 3/1988 |
|---|---|---|
| DE | 87 13 337 | 8/1988 |
| DE | 43 30 412 | 3/1995 |
| DE | 197 06 513 | 8/1998 |
| DE | 197 49 233 | 4/1999 |
| DE | 197 52 926 | 6/1999 |
| DE | 198 02 368 | 8/1999 |
| DE | 199 17 029 | 11/2000 |
| DE | 199 54 702 | 5/2001 |
| DE | 100 10 208 | 9/2001 |
| DE | 100 30 788 | 11/2001 |

(Continued)

OTHER PUBLICATIONS

Product description "Fluid Dynamic Bearings", Minebea, Nov. 4, 2002, 1 pp.

*Primary Examiner*—David M. Fenstermacher
(74) *Attorney, Agent, or Firm*—Townsend and Townsend and Crew LLP (57) ABSTRACT

A method for filling the bearing gap of a hydrodynamic bearing with a lubricant, where drops of lubricant are produced in a defined manner and are applied to a defined region of the bearing to be filled.

33 Claims, 5 Drawing Sheets

FOREIGN PATENT DOCUMENTS

| | | |
|---|---|---|
| DE | 101 62 055.1 | 6/2003 |
| JP | 57208415 | 12/1982 |
| JP | 2000-292374 | 10/2000 |
| JP | 2001-090733 | 4/2001 |
| JP | 2002-250341 | 9/2002 |

* cited by examiner

METHOD AND APPARATUS FOR FILLING THE BEARING GAP OF A HYDRODYNAMIC BEARING WITH A LUBRICANT

CROSS REFERENCE TO RELATED APPLICATIONS

This application claims all rights of priority to German Patent Application Serial No. 103 15 222.9 filed Mar. 31, 2003 (pending) and German Patent Application Serial No. 103 15 223.7 filed Mar. 31, 2003 (pending).

BACKGROUND OF THE INVENTION

The invention relates to a method and an apparatus for filling the bearing gap of a hydrodynamic bearing with a lubricant.

Hydrodynamic bearings, which are also referred to as fluid bearings, are used for example for a rotational support within high-precision spindle motors, utilized in hard disk drives and other high speed applications. In comparison with ball bearings, hydrodynamic bearings have higher running accuracy, quieter operation and much higher shock resistance (robustness). They operate virtually without any noise or wear, since, during operation at nominal speed, there is no direct physical contact with solid friction between the bearing parts rotating with respect to one another. Instead, there is a thin film of lubricant, for example a lubricating oil, located between the shaft and the shaft mount (bearing sleeve).

U.S. Pat. No. 5,778,948 discloses a method for introducing bearing fluid into a bearing having a fixed part and a rotating part. The fixed part and the rotating part are joined together in a high-pressure environment and subsequently brought into a low-pressure environment. In the low-pressure environment, the bearing fluid is introduced into a space between the fixed part and the rotating part. Next, this combination is brought back into the high-pressure environment in order to enable the bearing fluid to fill the space between the parts.

Another method for filling a fluid-dynamic bearing is disclosed in U.S. Pat. No. 6,305,439, in which a measured amount of oil is filled into a shaft opening and a shaft is subsequently inserted.

U.S. Pat. No. 5,601,125 discloses a further method for filling a hydrodynamic bearing with fluid.

U.S. Pat. No. 5,862,841 discloses an apparatus for filling a hydrodynamic bearing.

SUMMARY OF THE INVENTION

In accordance with the invention, a method and an apparatus for filling the bearing gap of a hydrodynamic bearing with lubricant are provided by means of which the filling of the bearing gap can be carried out in a reproducible way.

This is achieved by producing drops of lubricant in a defined manner and applying the drops of lubricant to a defined region of the bearing to be filled.

By applying drops of lubricant in a defined manner, the bearing gap can be filled with lubricant without any contact between the region to which the lubricant is applied and a lubricant source. This avoids reflux of lubricant, and consequent contamination of the lubricant in the lubricant source by returning lubricant.

By applying drops of lubricant produced in a defined manner it is possible to control the filling process in terms of time, space and volume with a high degree of reproducibility and to achieve filling of the bearing gap up to a desired, defined level. Furthermore, air inclusions in the lubricant introduced into the bearing gap can be avoided. As a further result, the properties of a correspondingly filled bearing are optimized.

The drops of lubricant can be produced individually and emitted one after the other. This allows contamination of an operating chamber with lubricant to be minimized.

The solution according to the invention allows a high degree of reproducibility with regard to the filling of the bearing gap to be achieved, since the filling amount can be adjusted within very narrow limits (i.e., precisely to the drop). The filling process can be monitored and documented in an easy way. The filling method according to the invention can be carried out in a single apparatus, so that the space requirement is minimized.

The method according to the invention allows the degree of filling of the bearing gap to be determined at any point in time, since the drops of lubricant are produced in a defined manner and are applied to a defined region of the bearing to be filled. In particular, the number of drops can then be counted in an easy way. It is then also possible indirectly for the amount of lubricant in the bearing gap to be determined, with no need to carry out measurements at the bearing gap itself to determine the degree of filling. As a result, the method according to the invention is also suitable for filling bearing gaps with a small hydrodynamic diameter and for filling bearing gaps which are covered by a cover plate, so that for example observation of these bearing gaps by optical means is not possible.

The method according to the invention can be carried out under vacuum conditions or under atmospheric conditions. The method according to the invention is suitable for clean room conditions, so that the filling of the bearing can take place in a clean room.

In particular, drops of lubricant are applied in a controlled manner to a bearing gap region between a shaft and a shaft mount and/or a region which is in fluidic connection with the bearing gap. This allows the filling process to be controlled in terms of time, space and volume with a high degree of reproducibility and filling of the bearing gap up to a desired, defined level to be achieved in an easy way.

It is most particularly advantageous if the production of drops of lubricant takes place away from the region to which they are to be applied. As a result, drops of lubricant can be directed specifically onto this region to which they are to be applied, and to a certain extent be "fired" onto this region. This then allows the effect to be achieved that only the defined region comes into contact with drops of lubricant. Since no reflux of lubricant from the region to which it is applied, for example to a lubricant source, takes place here, contamination of lubricant in the lubricant source is ruled out.

In particular, drops of lubricant from a lubricant drop generator are directed into the region to which they are applied. Drops of lubricant are then emitted in a defined direction, in particular at a defined speed. As a result, it can be ensured that lubricant only reaches the defined region of the bearing to be filled to which it is applied, so that contamination with lubricant can be reliably ruled out.

In particular, it is provided that the region to which lubricant is applied is not in fluidic contact with a lubricant source, in order in this way to prevent contamination of lubricant in the lubricant source by returning lubricant.

Since there is no reflux connection from the region to which lubricant is applied to the lubricant source, contamination of the lubricant source that could take place if such a reflux connection were present is ruled out from the outset.

The bearing gap to be filled is preferably closed on one side. As a result, filling can be achieved in an easy way. It is also possible when filling under vacuum conditions to force lubricant into the bearing gap by increasing the pressure.

It is most particularly advantageous if the production of drops of lubricant is controlled with respect to the drop size, in order in this way also to achieve filling in the case of bearing gaps with a small hydraulic diameter. With an appropriately chosen drop size, a film of lubricant can then form in a defined region at the shaft and the shaft mount, once again allowing optimum filling of the bearing gap to be achieved.

In the preferred embodiment of the invention, the average drop diameter of the produced micro-drops lies in the range between 50 µm and 150 µm and, in particular, in the range between 75 µm and 95 µm, if ester oil is used as the lubricating oil.

It is most particularly advantageous if drops of lubricant with a defined drop volume are produced. If drops of lubricant with a small range of variation of an average drop volume are produced, the volume of the lubricant which has been introduced into the bearing gap can be determined at any point in time by simply counting the drops of lubricant which reach the region to which they are applied. As a result, the degree of filling can be accurately determined at any point in time. The filling process can be ended when a predetermined filling amount is reached. The invention also allows to monitor and document the filling process, while the bearing gap is being filled to a predetermined filling amount with a high degree of reproducibility.

It is also advantageous if the region to which the drops of lubricant are applied is spatially predetermined. This allows for the lubricant to form a lubricant film, covering the bearing gap between the shaft and the shaft mount. This lubricant film can then be introduced into the bearing gap, for example by applying pressure. As a result, filling can be achieved even in the case of very small bearing gaps (i.e., having a small hydraulic diameter), without drop injection having to be carried out directly into the bearing gap, or at least without it having to be carried out deep into the bearing gap.

In particular, it is advantageous if it is ensured that a closed film of lubricant forms around the shaft, covering the bearing gap on the outside. As a result, the region of the bearing gap lying underneath the film of lubricant is separated in a gastight manner from a spatial region outside. If the lubricant is then forced into the bearing gap, for example under the influence of atmospheric pressure, it is ensured that no air is sucked into the bearing gap with it, so that air inclusions in the lubricant in the bearing gap are avoided. Furthermore, in this way a continuous film of lubricant forms, the volume of which is dimensioned such that the desired filling level in the bearing gap is achieved. By controlling the amount of the drops, the lubricant volume of the film of lubricant can be set.

It may also be provided that the production of drops of lubricant is controlled with respect to the drop speed. This allows an optimum value of the speed to be set; it is set such that the drops reach the desired region to which they are applied without drops that impinge on the film of lubricant interrupting or breaking open the film of lubricant, for example.

Furthermore, it is advantageous if the production of drops of lubricant is controlled with respect to the drop production rate. This allows a volumetric control of the application of drops to be achieved, i.e. a control of the amount of the drops reaching the region to which they are applied can be achieved. As a result, a desired filling level of the lubricant in the bearing gap can once again be set.

For the volumetric control of the application of drops, the number of produced drops is precisely counted. The counting may be accomplished by electronic means and/or optical means. Optical counting is preferred for determining the number of drops which reach the desired region.

It is most particularly advantageous if the number of drops of lubricant produced is counted. If it is ensured that substantially all the drops of lubricant produced reach the region to which they are applied, this number is an accurate measure of the lubricant volume introduced into the bearing gap.

It may in this case be provided that the number of drops produced is determined away from the lubricant drop generator, in that a corresponding measuring device is disposed upstream of a nozzle of the lubricant drop generator. It is also possible to determine the number of drops of lubricant produced by a lubricant drop generator on the basis of the production of drops. The production of drops of lubricant is triggered for example by an electronic pulse by means of a piezo actuator. If electronic pulses which trigger the production of drops of lubricant are counted, a direct measure of the drops of lubricant produced is obtained. In this way, the number of produced drops of lubricant is determined by electronic means.

It is most particularly advantageous if the degree of filling of the bearing gap is determined on the basis of counting the drops of lubricant. When the production of the drops of lubricant is defined, the volume of the lubricant drops varies within a relatively small range. By counting the drops of lubricant at the production point or the defined destination region, the volume of the lubricant introduced into the bearing gap to be filled can be accurately calculated. Consequently the degree of filling can be precisely determined, at any point in time. By determining the degree of filling, the filling amount can then also be set in a defined manner.

It may be provided that the drops of lubricant are optically counted, for example by means of a light barrier device.

Additionally, the light barrier device can be utilized to count the number of drops of lubricant reaching the region of the bearing to be filled to which they are to be applied. For example, for this purpose a light barrier device is disposed in the vicinity of the region to which the drops are applied. Thus, the number of drops of lubricant which reach the application region can be determined in a very direct way. As a result, a direct measure of the lubricant volume which has been introduced into the bearing gap is obtained.

Lubricant drop counting can be achieved in another easy way if the drops of lubricant which fly through a measuring line are counted. The measuring line establishes a defined spatial region which is monitored for the drops flying through.

In particular, the measuring line is aligned transversely in relation to a direction in which the drops of lubricant fly, so that a relatively large spatial region with respect to drops of lubricant flying through can be monitored.

For example, the measuring line is defined by means of a transmitter-receiver system. The transmitter is preferably a light source and the receiver is preferably a light detector. If a drop of lubricant then flies through the measuring line, the receiver signal changes, this change in the signal serves as a detection signal indicating a drop of lubricant.

The production of drops of lubricant and the counting of drops of lubricant may be correlated with each other. This allows for an added counting accuracy when the drop count of lubricant increases.

In one of the preferred embodiments, a lubricant drop generator and a counting device for drops of lubricant are coupled to each other. Components of the electronic signals that trigger production of drops of lubricant are also transmitted to the counting device. These components are, in particular, the pulse sequence and, in the case of regular signals, the frequency. The signal level, which may be a measure of the volume of a drop produced, may also be transmitted. The counting device can then be used in an easy way for determining the degree of volumetric filling of the bearing gap at any point in time.

According to the invention, the application region of the bearing to be filled can be automatically determined. It can then be achieved that relative alignment between the bearing to be filled, and in particular the application region of the bearing, and the lubricant drop generator is carried out automatically, so that no intervention by the user is necessary here. As a result, a defined direction of the emitted drops onto the region to which they are applied can be achieved.

Further, the region to which lubricant is applied may be determined by optical means. In one preferred embodiment, for example, a digital camera is directed at the application region of the bearing to be filled and then a corresponding signal is passed on to a control device, which positions the bearing in such a way that the region to which lubricant is applied and the lubricant drop generator are aligned with each other. The region to which lubricant is to be applied is preferably determined by means of image processing.

Moreover, the lubricant drop generator and a region of the bearing to be filled to which lubricant is applied may be automatically positioned such that they are aligned with respect to each other.

It may be provided that the application of drops takes place in an operating chamber under vacuum conditions, the pressure lying in particular below 1 mbar, at least for a time. Under these conditions, even a bearing which is closed on one side, i.e., the bearing gap of which is only accessible from one end face of the shaft mount, can be filled with lubricant while avoiding air inclusions. For this purpose, the air is sucked out of the bearing gap before filling such that the vacuum is created within the bearing gap. This filling without air inclusions can be achieved by ensuring that in the first instance a sufficient amount of lubricant is accumulated in a neck region between the shaft and the shaft mount. The lubricant can then flow from the neck region around the shaft and form an uninterrupted ring of lubricant, which covers the bearing gap and seals it. Subsequently, air is admitted to the operating chamber, so that the exterior air pressure forces the lubricant of the lubricant ring into the bearing gap and filling of the bearing gap takes place in this way. This filling process can also be applied to bearing gaps with a very small hydraulic diameter without the risk of air bubbles being present in the lubricant.

An amount of lubricant is applied (before admitting air to the operating chamber) in a way corresponding to the desired degree of filling of the bearing gap.

In accordance with the invention, an apparatus with a lubricant drop generator is provided, by means of which drops of lubricant can be directed in a defined (controlled) manner into a bearing gap and/or into a region in fluidic connection with the bearing gap.

A device for counting drops of lubricant produced may be provided with the present invention. As a result, control over the amount (volumetric control) of the application of drops of lubricant can be achieved by determination of the number of drops. The counting may take place for example electronically and/or optically.

For example, a counting device may be associated with the lubricant drop generator. This may involve electronic counting (for example on the basis of counting the droplet-generating pulses of a piezo actuator) or optical counting.

In the case of optical counting, a camera is provided in particular, for example a CCD camera (which may also be positioned away from the generator).

The counting device may also comprise a light barrier device, by means of which the number of drops of lubricant flying through a measuring line can be determined. By means of a light barrier device it is possible to define a measuring line by means of the transmitter and receiver, drops of lubricant flying through this measuring line being detectable in an easy way.

In its preferred embodiment, the invention provides an emission device, which comprises a nozzle emitting drops of lubricant in a defined, directed manner.

It is advantageous if the bearing and the lubricant drop generator can be particularly positioned with respect to each other and in particular are movable in relation to each other. As a result, defined filling of the bearing gap can be achieved by means of the lubricant drop generator, by means of which a spatially defined region to which lubricant is applied can be set with a high degree of reproducibility. In particular, it is made possible to produce around the shaft at the bearing gap a continuous film of lubricant, which can then be passed into the bearing gap.

It is also advantageous if the lubricant drop generator is positioned at a sufficient distance from the bearing, to avoid a reflux of lubricant, wherein the risk of lubricant contamination is avoided.

In the case of an exemplary embodiment, the lubricant drop generator comprises a nozzle head with a piezo actuator. By means of such piezo actuator, an impulse which accelerates the fluid can be produced in a column of lubricant fluid. By controlling this acceleration, cutting-off of a micro-drop can be achieved, thus making it possible to control drop production, for example with respect to the drop size. The production of drops can also be controlled in terms of time. Furthermore, the drop speed can be controlled and, by appropriate positioning of the metering head with respect to the bearing gap, the direction of the drops of lubricant for application to the bearing can be set.

An operating chamber which can be air-emptied is provided in this case for accommodating the bearing. The vacuumed operating chamber allows for a continuity of lubricant drop production under vacuum conditions. Lubricant then penetrates into the bearing gap, and completely fills the gap up to the desired level without air inclusions, after atmospheric pressure has been introduced into the chamber.

It is advantageous if a lubricant source is disposed in an vacuumed spatial region, and in particular in the operating chamber. This is conducive to degassing of the liquid lubricant, that is ensured as a result of the uninterrupted production of drops.

Furthermore, it is advantageous if a control device is provided with the invention for controlling the production of drops of lubricant and the application of drops of lubricant to the bearing. It is additionally advantageous if this control device permits controlled changing of the pressure in the operating chamber in which the lubricant filling process is taking place. Thus, the provided method of lubricant filling of the hydrodynamic bearing, preferably conducted automatically, ensures that the desired filling level is maintained in a reproducible way without any occurrence of air inclusions.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE INVENTION

In the case of hydrodynamic bearings (which are also referred to as fluid dynamic bearings), a film of lubricant is introduced into the bearing gap between the shaft and the shaft mount (bearing sleeve). This film of lubricant permits floating of the rotating bearing part (of the shaft if it is connected in a rotationally fixed manner to a rotor, or of the bearing sleeve if the latter is connected in a rotationally fixed manner to the rotor) during the starting up of an electric motor, for example. The corresponding pressure generation takes place contactlessly. In other words, there is no solid friction between the fixed surface and the rotating surface.

Pressure-generating structures, which are formed by appropriate patterns of grooves disposed on corresponding bearing surfaces of the shaft and/or the bearing sleeve, cause hydrodynamic pressure gradients to be created in the film of lubricant. The local pressure gradients are substantially inversely proportional to the gap thickness of the bearing gap, so that displacements between the shaft and the shaft mount are immediately compensated in a self-regulating manner. As a result, stable concentric alignment between the shaft and the shaft mount can be ensured.

Hydrodynamic bearings have for this reason a particularly high running accuracy and rotational accuracy. They operate virtually without any wear. They are distinguished by low noise and by shock resistance.

Fluid-dynamic bearings are preferably used for the rotary mounting of high-precision spindle motors for hard disk drives.

In the production of a hydrodynamic bearing, the bearing gap must be filled with the lubricant after the components have been assembled. A typical example of a lubricant is ester oil.

Figure 1:
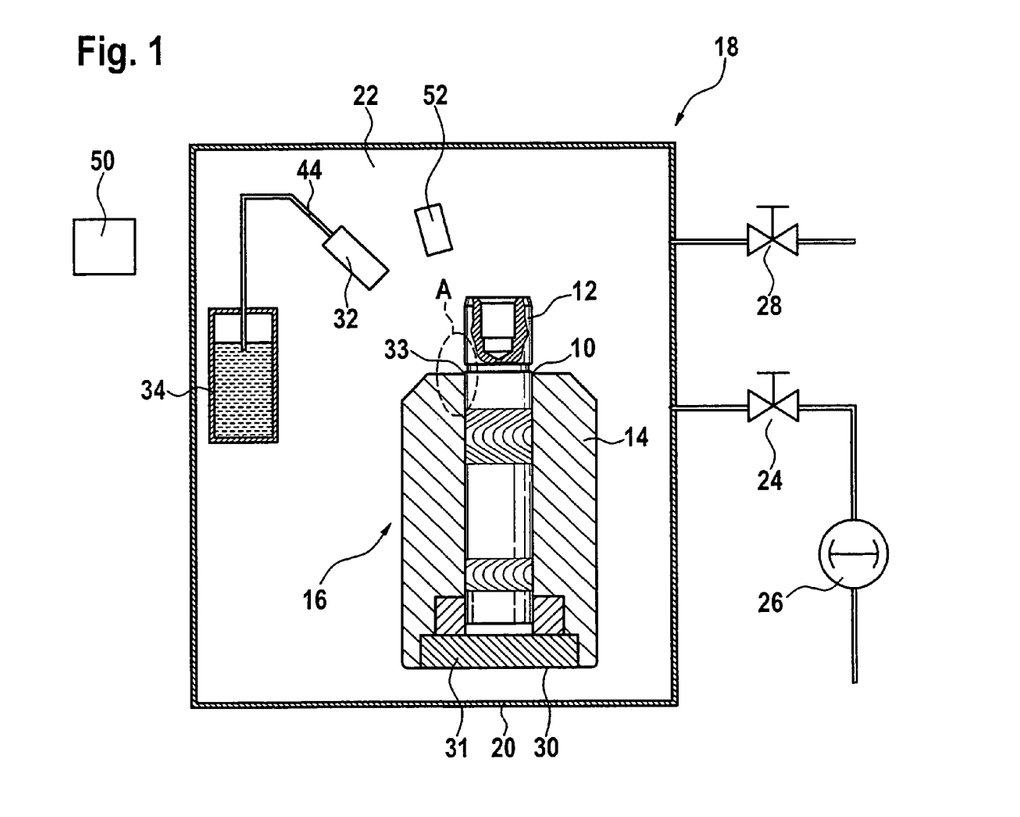
FIG. 1 is a schematic view of a first preferred embodiment of an apparatus according to the invention for introducing lubricant into the bearing gap between the shaft and the shaft mount of a fluid-dynamic bearing.

A first exemplary embodiment of an apparatus according to the invention for introducing lubricant into the bearing gap 10 between a shaft 12 and a shaft mount 14 (bearing sleeve) of a hydrodynamic bearing 16 is schematically shown in FIG. 1 and designated there as a whole by reference numeral 18.

The apparatus 18 comprises a capsule 20, which can be closed in an airtight manner thus forming an operating chamber 22 for accommodating the bearing 16 to be filled. The operating chamber 22 can be vacuumed, so that a filling process can take place under vacuum conditions.

For this purpose, the operating chamber 22 is connected via a controllable valve 24 to a pump 26, by means of which a partial vacuum with respect to the outside atmospheric pressure can be produced in the operating chamber 22. In particular, a pressure lower than 1 mbar can be achieved in the operating chamber 22.

Also provided is a controllable valve 28, by means of which air can be admitted to the operating chamber 22 in a time-controlled manner, in order in particular to allow atmospheric pressure conditions to be produced in the operating chamber 22.

The bearing 16 positioned in the operating chamber 22 is closed in a gastight manner at one end 30 of the shaft mount 14 by an abutment 31.

Provided at the opposite end is a widening 33, by which the local width of the bearing gap 10 is increased. The widening 33 may be formed on the shaft mount, in that the latter, for example, comprises a hollow truncated conical recess and/or is formed by a constriction on the shaft 12.

Filling of the bearing gap 10 takes place via the open side of the shaft mount 14. A thin continuous film of lubricant forms within the bearing gap 10. The capillary forces effective in this film of lubricant and the forces of adhesion between the lubricant and the metallic bearing surfaces (on the shaft 12 and on the inner surface of the shaft mount 14 facing the shaft 12) provide stability for the film of lubricant. These forces also prevent the film of lubricant from escaping from the bearing gap 10.

For filling the bearing gap 10 with lubricant, a lubricant drop generator 32 (drop dispenser), with which drops of lubricant can be produced in a controlled manner and can be directed onto the bearing gap 10 in a controlled manner, is disposed in the operating chamber 22.

On account of their kinetic momentum, the drops of lubricant fly onto the bearing gap 10, so that they are to a certain extent fired at it.

The lubricant drop generator 32 is connected to a lubricant source 34, so that the replenishment of the lubricant is ensured. The lubricant drop generator 32 itself is at a spacing from the bearing 16 and, in particular, is not in a fluidic contact with the bearing 16. Consequently, the lubricant source 34 is also not in a fluidic contact with the bearing 16. There is consequently no reflux connection between the bearing 16 and the lubricant source 34, so that contamination by returning lubricant is ruled out. According to the invention, only the amount of lubricant needed for filling the bearing gap 10 is delivered.

The lubricant source 34 is preferably disposed in a vacuumed spatial region, for example in the operating chamber 22. If the lubricant source 34 is under a partial vacuum, this is conducive to degassing taking place there. This ensures the functional capability of the drop production.

Figure 2:
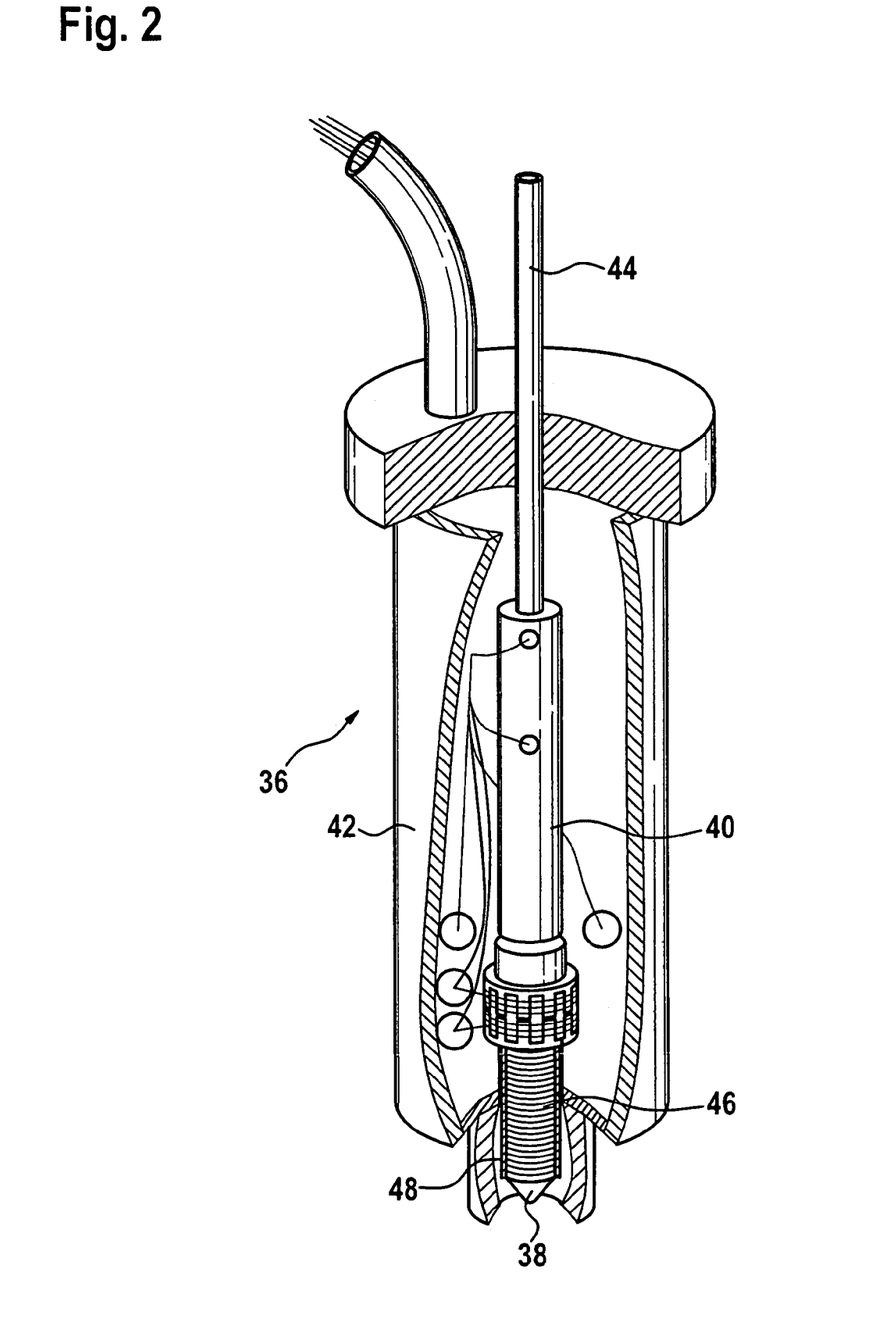
FIG. 2 is a perspective sectional view of an embodiment of a metering head of a lubricant drop generator.

As shown by way of example in FIG. 2, the lubricant drop generator 32 comprises a metering head 36 with a nozzle 38, by means of which drops of lubricant can be directed specifically toward the bearing gap 10. The metering head 36 in this case is positionable in relation to the bearing 16, in order to allow drops of lubricant to be applied to a defined application region.

In particular, the metering head 36 and the bearing 16 are in this case movable with respect to each other. It is also possible for them to be rotatable in relation to each other, so that the bearing gap 10 can be filled over a circumferential direction.

It has been found in practice that uniform filling around the circumference is achieved even without relative movement, since the flowing properties of the lubricating oil are adequate.

In the case of one embodiment of the metering head 36, a piezo actuator 40, which is disposed in a housing 42, is provided. The piezo actuator 40 is in connection with the lubricant source 34 via a fluid line 44.

The nozzle 38 is filled on a capillary tube 46 or is formed in one piece with the latter. In the capillary tube 46 there is a fluid column of the liquid lubricant. Because it is formed as a capillary tube no fluid comes out of the nozzle 38 when the piezo actuator 40 is inactive.

When the piezo actuator 40 is activated, this fluid column receives a mechanical impulse, which accelerates the fluid. This causes a single drop to form, overcoming the surface tension, at the end of the fluid column on the nozzle side and to separate from the metering head 36.

The piezo actuator 40 can be used to influence the drop formation within wide ranges. The metering head 36 makes it possible to control the drop formation with respect to the amount of the drops (volumetric control) and the application of the drops in terms of time and place. Emitted drops of lubricant can be applied with a high degree of reproducibility to a desired region on the bearing 16, so that a process of filling the bearing gap 10 in a specifically directed manner is made possible.

A nozzle heater 48 may also be provided in this case, allowing the viscosity of the lubricant to be reduced by heating, in order in this way to be able to influence the production of drops of lubricant.

For controlling the drop formation and application of drops, a control device 50 may be provided (FIG. 1), by means of which in particular the piezo actuator 40 can be controlled and which can also act on the control valves 24 and 28.

The control device 50 allows the amount of lubricant applied to the bearing 16 to be determined electronically on the basis of the application of pulses to the piezo actuator 40. In addition or as an alternative, a counting device 52 may be provided, by means of which the application of drops of lubricant to the bearing 16 is optically determined. This counting device 52 may be disposed on the metering head 36 or at a spacing from it. The counting device 52 comprises, for example, a CCD camera.

In an alternative embodiment of the invention, the metering head 36 comprises an integrated stroboscope LED, to allow the emission of drops to be made observable and to allow the application of drops to be registered by a counting device 52.

In particular, the counting device 52 is in connection with the control device 50, in order in this way to achieve specific control or regulation of the lubricant filling of the bearing 16.

The method according to the invention for introducing lubricant into the bearing gap 10 between the shaft 12 and the shaft mount 14 works as follows in conjunction with the apparatus 18:

The metering head 36 and the bearing 16 to be filled, which is open to one side at the bearing gap 10, are positioned in the operating chamber 22, the metering head 36 being aligned with this open side (FIG. 3(a)).

The operating chamber 22 is evacuated and thereby brought in particular below a pressure of 1 mbar.

Drops of lubricant are then emitted ("fired") toward the bearing gap 10 via the metering head 36 under vacuum conditions. The diameter of these micro-drops of lubricant is dependent, among other things, on the viscosity of the lubricant. When ester oil is used, the diameter is typically between about 75 μm and 95 μm.

The lubricant drop generator 32 is activated and the drops of lubricant eject at high speed from the nozzle 38, which is spaced away from the bearing gap 10, and fly in the direction of the bearing gap 10. They impinge in the bearing gap region 54 and/or in a neck region 56 between the shaft 12 and an end face 57 of the shaft mount 14. An accumulation of lubricant then forms in this neck region 56 and, if sufficient amount of lubricant is applied, leads to the formation of a ring of fluid 58, which covers the bearing gap 10 and in this region surrounds the shaft 12 (FIG. 3(b)).

The fact that all the drops of lubricant impinge in the bearing gap region 54 or in the neck region 56 on account of the alignment of the nozzle 38 with the bearing gap 10 ensures that substantially the entire amount of lubricant directed at the regions to which it is applied 54, 56 is used for filling the bearing gap 10.

It has been found that the ring of lubricant 58 forms itself. However, it may also be provided that the metering head 36 and the bearing 16 to be filled are moved with respect to each other, in order to form a closed ring of fluid 58 in neck region 56 enclosing the shaft 12. This closed ring of fluid 58 completely covers the bearing gap region 54.

It may also be advantageous to provide a plurality of metering heads 36 disposed around the shaft 12 in a distributed manner.

Controlling the application of drops of lubricant to the bearing 16 to be filled takes place in such a way that the closed ring of fluid 58 can form in the neck region 56 around the shaft 12. This ring of lubricant 58 forms a meniscus, i.e., the convex, the surface of which completely covers the bearing gap 10 (FIG. 3(b)). The bearing gap 10 underneath this ring of lubricant 58 is in this case vacuumed in a way corresponding to the vacuum conditions in the operating chamber 22, the ring of lubricant 58 also being able to reach at least partly into the region 54 of the bearing gap 10.

The application of drops is controlled in terms of the amount in such a way that the volume of the ring of lubricant 58 is dimensioned to fill the bearing gap 10 up to a desired filling level.

After ending the drop transfer from the nozzle 38 to the bearing gap 10, air is admitted into the operating chamber 22 (FIGS. 3(c) and 3(d)). As a result, the amount of lubricant forming the ring of lubricant 58 is forced into the bearing gap 10 on account of the rising pressure in the operating chamber 22.

Since the ring of lubricant 58 completely covers the bearing gap 10, the inclusion of air bubbles when the lubricant penetrates into the bearing gap 10 is reliably prevented.

Figure 3:
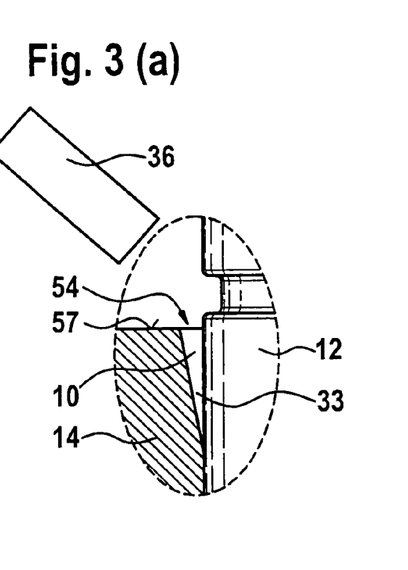
FIGS. 3(a) to 3(d) are enlarged representations of the region "A", according to FIG. 1, as successive snapshots of the sequence of the steps of the method for introducing the lubricant.

Under atmospheric conditions, that is normal pressure, the entire bearing gap 10 is completely filled. The bearing gap region 33 is also filled up to the desired filling level, as indicated in FIG. 3(*d*).

The apparatus according to the invention and the method according to the invention, which can be carried out with this apparatus, also allow bearing gaps with a very small hydraulic diameter to be filled in a defined manner without air inclusions.

Figure 4:
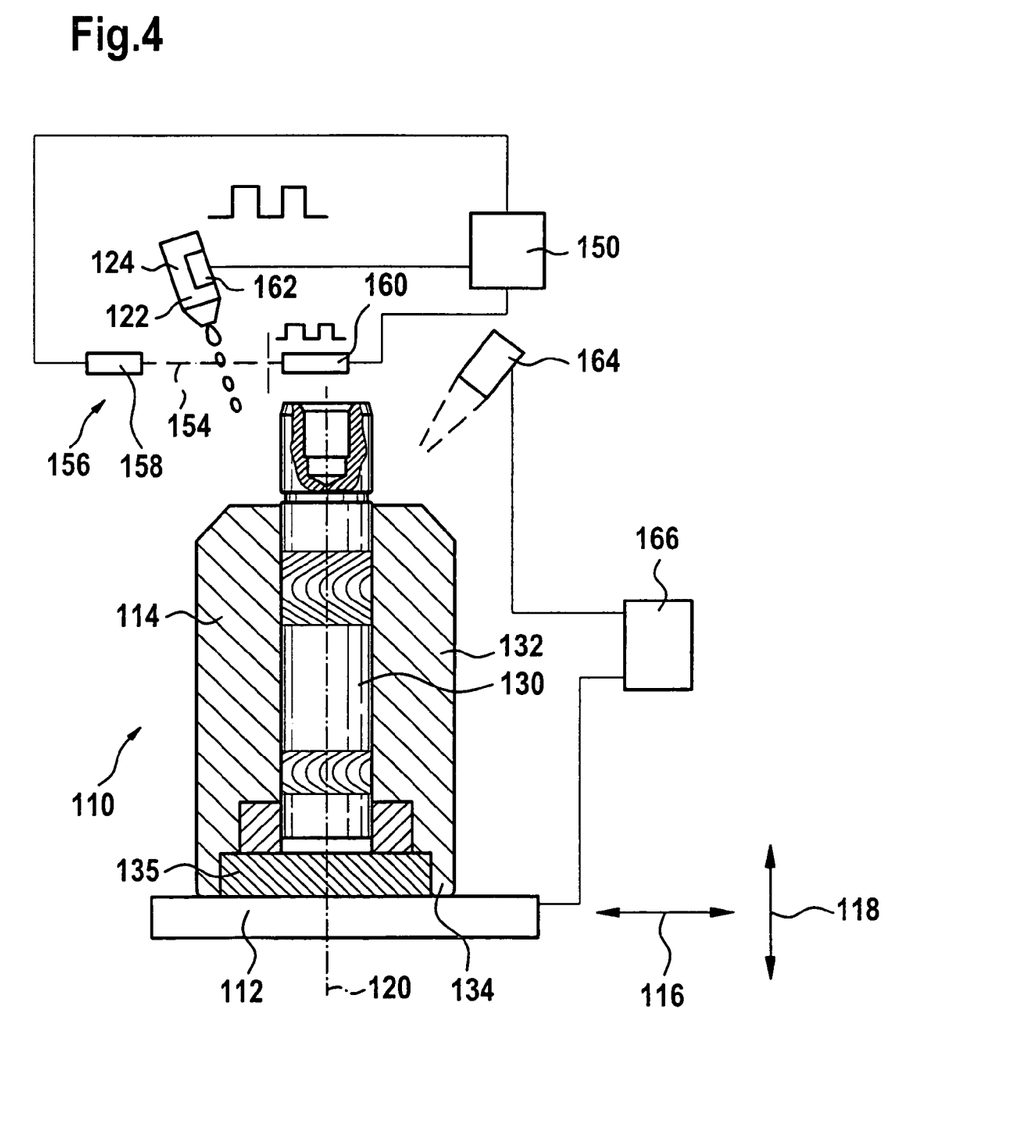
FIG. 4 is a schematic representation of a second preferred embodiment of an apparatus according to the invention for filling the bearing gap of a hydrodynamic bearing with lubricant.

A second preferred embodiment of an apparatus according to the invention for filling the bearing gap of a hydrodynamic bearing with lubricant, is shown in FIG. 4. The apparatus 110 comprises a holder 112, on which a bearing 114 to be filled can be fixed. The holder 112 may be, for example, a slide which is displaceable in a horizontal plane (indicated by the reference numeral 116) and is displaceable in a vertical plane (indicated by the reference numeral 118). It may also be provided that the holder is rotatable about an axis 120.

Figure 5:
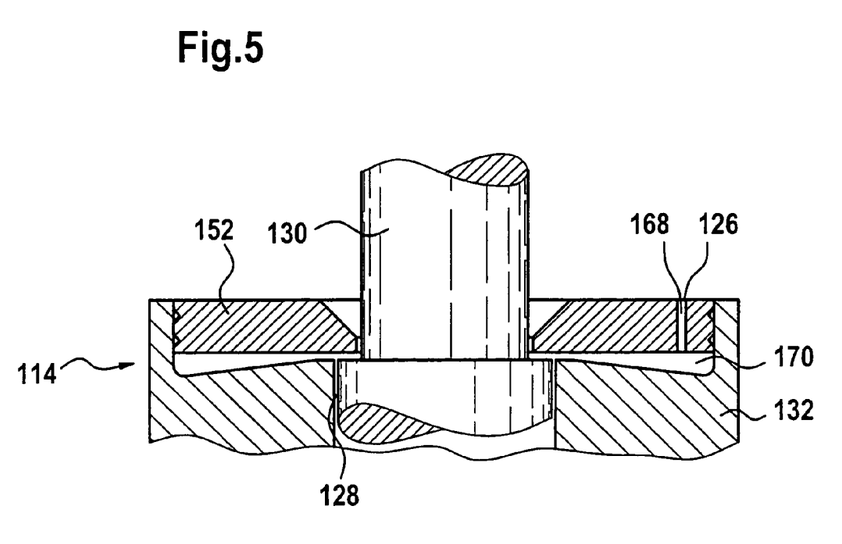
FIG. 5 is a schematic partial representation of a preferred embodiment of a hydrodynamic bearing which can be filled by the method according to the invention.

A bearing 114 to be filled is properly positioned with respect to an emission device 122 generating drops of lubricant by means of a correspondingly controlled movement of the holder 112. The emission device 122 comprises a lubricant drop generator 124, by which drops of lubricant can be applied to a defined region 126 (an example of such region is shown in FIG. 5) of the bearing 114 to be filled. An exemplary embodiment of a lubricant drop generator 124 was described above in conjunction with FIG. 2.

By applying lubricant to this region 126, the bearing gap 128 between the shaft 130 and the shaft mount 132 (bearing sleeve) can be filled with said lubricant.

For example, a bearing 114 is filled via a side of the shaft mount 132 which lies opposite from a side 134, with which the bearing 114 is positioned on the holder 112. On this side 134, the shaft mount 132 may be closed by means of an abutment 135.

According to the invention, a counting device 150 for counting the drops of lubricant produced is provided. By counting the drops of lubricant which get into the region 126 to which the drops are applied of the bearing 114 to be filled, the degree of filling of the bearing gap 128 can be determined with high accuracy at any point in time during the filling process. The degree of filling is thereby determined indirectly, that is by counting the drops while the volume of the drops is known. As a result, no measurement has to be performed at the bearing gap 128 itself to determine the degree of filling. The method according to the invention is therefore also suitable for the filling of very narrow bearing gaps (the gap widths in the case of hydrodynamic bearings such as are used in electric motors for hard disk drives lie in the range of a few micrometers), it also being possible to determine the degree of filling when the bearing gap 128 is covered by a cover plate 152 during the filling (FIG. 5).

The counting device 150 has, for example, a measuring line 154, which is disposed in the vicinity of the outlet opening of the nozzle 38. The drops of lubricant which fly through the measuring line 154 are counted. Provided in particular for this purpose is a light barrier device 156, which comprises a transmitter 158 and a receiver 160. The transmitter 158 emits a light beam, which is received by the receiver 160. The light beam between the transmitter 158 and the receiver 160 defines the measuring line 154.

If a drop of lubricant flies through the light beam, the signal received by the receiver 160 changes. This change in the signal indicates a drop flying through. The direction of flight of the drops of lubricant through the measuring line 154 lies transversely in relation to this measuring line 154.

The transmitter 158 and the receiver 160 of the light barrier device 156 are formed such that drops of lubricant of the relevant diameter range are detectable. The typical drop diameter for the filling of a hydrodynamic bearing which is intended for the rotary mounting of a spindle motor in a hard disk drive lies here in the range between 50 μm and 150 μm. A typical lubricant is ester oil. In the case of the method according to the invention, drops of lubricant of a defined diameter are produced with a small range of variation about the average diameter.

Additionally, a measuring line which lies in the vicinity of the region 126 to which lubricant is applied may be provided. By means of this measuring line, which once again is formed between a transmitter and a receiver, the drops of lubricant which reach the region 126 to which they are applied can be counted.

A plurality of spaced-apart measuring lines may be provided, by means of which drop counting can be carried out at a plurality of locations of the flying path. In particular, a measuring line may be provided in the vicinity of the nozzle outlet, in order to determine the number of drops of lubricant emitted, and a further measuring line may be provided in the vicinity of the region 126 to which the drops of lubricant are applied, in order to determine the number of said drops reaching this region.

The drops of lubricant are produced in the lubricant drop generator 124 with a specific frequency, which is for example of the order of magnitude of 4000 Hz. As an alternative or in addition, it may be provided in this respect that the number of drops of lubricant produced is determined directly by means of the driving circuit 162 of the piezo actuator 40. Activation of the piezo actuator 40 by the driving circuit 162 means the production of a drop of lubricant each time, so that pulse counting of the driving circuit 162 also means drop counting with respect to the production of drops of lubricant.

It may in this case also be provided that a correlation between a receiver signal of a receiver 160 and the production of drops of lubricant is carried out by means of the counting device 150. As a result, drops of lubricant which cross through a corresponding measuring line 154 can be detected better, since the receiver 160 can to a certain extent be notified of the flying through the measuring line 154.

A digital camera 164 may also be provided, by means of which automatic positioning of the holder 112 with the bearing 114 in relation to the metering head 136 is made possible. For this purpose, the camera is aligned with the bearing 114 to be filled. The digital camera 164 delivers its signals to a control device 166, which controls the movement of the holder 112. The holder 112 is displaced, and possibly rotated, until the nozzle 38 of the metering head 36 is aligned with the region 126 to which drops of lubricant are to be applied. The digital camera 164 serves in particular for detecting this region 126, in order then to be able to carry out the corresponding automatic relative positioning between the metering head 136 and the bearing 114 to be filled.

The filling of the bearing gap 128 by means of the apparatus 110 may take place under atmospheric conditions or under vacuum conditions.

The method according to the invention works as follows in conjunction with the apparatus 110:

The bearing 114 to be filled is positioned, in particular automatically, with its region 126 to which lubricant is to be applied with respect to the metering head 36, so that the drops of lubricant emitted enter the region 126 in their entirety.

The region 126 may in this case be, for example, an inlet region of a continuous clearance 168, at a spacing from the shaft 130, in the form of a channel in a cover plate 152. This clearance 168 is connected to an equalizing space 170, which lies above the bearing gap 128. A hydrodynamic bearing with such an equalizing volume is described in the German Patent Application No. 102 31 962.6 of Jul. 15, 2002 of the same applicant (incorporated herein by reference in its entirety), which is not a prior publication. The width of the cross-section may be of the order of magnitude of 300 µm.

Since, according to the invention, drops of lubricant can also be produced with a small diameter (for example with a typical order of magnitude of 75 µm) and can be emitted to the region 126 in a directed manner, substantially all the drops emitted reaching the region 126, the bearing gap 128 can be filled via the clearance 168. The clearance 168 may in this case also be formed as a micro-channel.

By means of the counting device 150, the number of drops which have arrived in the region 126 at any point in time is known. Since, in the case of the method according to the invention, the drops are produced in a defined manner, so that their volume is known, the volume of lubricant that has been introduced into the bearing gap 128 via the clearance 168 at any point in time is also known. As a result, the degree of filling of the bearing gap 128 ay any point in time is also known.

This degree of filling can in this case be determined with the region 126 formed in different ways. In FIG. 5, an embodiment of a hydrodynamic bearing with a covered bearing gap 128 is shown by way of example. A clearance 168 in the form of a channel is formed in the cover plate 152.

However, even if the bearing gap 128 is filled directly, in that drops of lubricant are directed into it (to a certain extent are "fired" into it), the degree of filling of the bearing gap 128 can be determined at any point in time in an easy way. Subsequent measurement is not necessary to determine the filling state after ending the filling process.

By means of the method according to the invention and the apparatus according to the invention, by which the method according to the invention can be carried out, a high degree of reproducibility can be achieved for the amount of lubricant used for filling. At the same time, the filling process can be monitored and documented. The filling of the bearing 114 can be carried out in a single apparatus 110, so that the space requirement is minimized.

Since the drops of lubricant can be directed specifically onto the region 126 to which they are to be applied, the effort for subsequently cleaning excess lubricant from the filled bearing 114 and the apparatus 110 can be avoided entirely, or at least minimized.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

The invention claimed is:

1. Method for filling a bearing gap of a hydrodynamic bearing with a lubricant, comprising the steps of:
    producing drops of lubricant in a defined manner;
    wherein the production of drops of lubricant is controlled with respect to the drop size;
    applying the drops of lubricant in a controlled manner by firing them from a lubricant drop generator to a defined region of the bearing to be filled, wherein said defined region is at least one of a bearing gap region between a shaft and a shaft mount and a region which is in fluidic connection with the bearing gap;
    counting the drops of lubricant; and
    determining the degree of filling of the bearing gap based on counting the drops of lubricant.

2. Method according to claim 1, wherein drops of lubricant are applied in a controlled manner to at least one of a bearing gap region between a shaft and a shaft mount and a region which is in fluidic connection with the bearing gap.

3. Method according to claim 1, wherein said production of drops of lubricant is performed away from the region to which they are applied.

4. Method according to claim 1, wherein said drops of lubricant are produced from a lubricant drop generator and are directed into the region to which they are to be applied.

5. Method according to claim 1, wherein said defined region to which lubricant is applied is not in fluidic contact with a lubricant source.

6. Method according to claim 5, wherein there is no reflux connection from the defined region to said lubricant source.

7. Method according to claim 1, wherein the bearing gap to be filled is closed on one side.

8. Method according to claim 1, wherein the production of drops of lubricant is controlled with respect to the drop size.

9. Method according to claim 8, wherein an average diameter of said drops lies in the range between 50 µm and 150 µm.

10. Method according to claim 8, wherein an average diameter of said drops lies in the range between 75 µm and 95 µm.

11. Method according to claim 1, wherein drops of lubricant with a defined drop volume are produced.

12. Method according to claim 1, wherein the region to which the drops of lubricant are applied is spatially predetermined.

13. Method according to claim 1, wherein a closed film of lubricant forms around the shaft, covering the bearing gap on the outside.

14. Method according to claim 1, wherein the production of drops of lubricant is controlled with respect to the drop speed.

15. Method according to claim 1, wherein the production of drops of lubricant is controlled with respect to the drop production rate.

16. Method according to claim 1, further comprising the step of counting the drops of lubricant.

17. Method according to claim 16, wherein the number of drops of lubricant produced by a lubricant drop generator is determined during the production of drops.

18. Method according to claim 16, wherein the degree of filling of the bearing gap is determined based on counting the drops of lubricant.

19. Method according to claim 16, wherein said step of counting said drops is performed by optically counting the drops of lubricant.

20. Method according to claim 16, wherein the number of drops of lubricant is counted when they reach the defined region of the bearing.

21. Method according to claim 16, wherein the number of drops of lubricant is counted when they fly through a measuring path.

22. Method according to claim 21, wherein the measuring path is positioned transversely with respect to a direction in which the drops of lubricant fly.

23. Method according to claim 21, wherein the measuring path is defined by means of a transmitter-receiver system.

24. Method according to claim 16, wherein the step of production of drops of lubricant and the step of counting the drops of lubricant are correlated with each other.

25. Method according to claim 24, wherein a lubricant drop generator and a device for counting drops of lubricant are coupled to each other.

26. Method according to claim 1, wherein the defined region of the bearing to which lubricant is to be applied is automatically determined.

27. Method according to claim 26, wherein the defined region to which lubricant is to be applied is determined by optical means.

28. Method according to claim 26, wherein the defined region to which lubricant is to be applied is determined by means of image processing.

29. Method according to claim 1, wherein a lubricant drop generator and the defined region of the bearing to which lubricant is to be applied are automatically positioned such that they are aligned with respect to each other.

30. Method according to claim 1, wherein the step of applying said drops is performed in an operating chamber under vacuum conditions.

31. Method according to claim 30, wherein the pressure in the operating chamber lies below 1 mbar at least for a predetermined period of time.

32. Method according to claim 30, wherein air is admitted to the operating chamber after the application of drops to the bearing is completed.

33. Method according to claim 1, wherein an amount of lubricant is applied in a way corresponding to a filling level of the bearing gap.

* * * * *